(12) United States Patent
Shen et al.

(10) Patent No.: US 9,071,475 B2
(45) Date of Patent: Jun. 30, 2015

(54) METHODS AND APPARATUS FOR NOISE ESTIMATION OF COMMUNICATION TERMINALS

(71) Applicant: Spreadtrum Communications (Shanghai) Co., Ltd., Shanghai (CN)

(72) Inventors: Xuqiang Shen, Shanghai (CN); Xiaojian Dong, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/002,120

(22) PCT Filed: Dec. 19, 2012

(86) PCT No.: PCT/CN2012/086926
§ 371 (c)(1),
(2) Date: Aug. 29, 2013

(87) PCT Pub. No.: WO2013/091541
PCT Pub. Date: Jun. 27, 2013

(65) Prior Publication Data
US 2014/0307641 A1    Oct. 16, 2014

(30) Foreign Application Priority Data

Dec. 21, 2011  (CN) .......................... 2011 1 0433739

(51) Int. Cl.
*H04L 25/02* (2006.01)
*H04L 1/20* (2006.01)
(Continued)

(52) U.S. Cl.
CPC ............ *H04L 25/0228* (2013.01); *H04L 1/206* (2013.01); *H04L 5/0007* (2013.01);
(Continued)

(58) Field of Classification Search
CPC ................ H04L 25/0228; H04L 1/206; H04L 25/03866; H04L 5/0007; H04L 5/0023; H04L 5/0048; H04B 17/345; H04B 17/318; H04B 17/336

USPC .......... 370/206, 208; 375/260, 267, 295, 299, 375/316
See application file for complete search history.

(56) References Cited

U.S. PATENT DOCUMENTS 6,717,976 B1    4/2004  Shen
8,139,666 B2 *  3/2012  Hung et al. ................... 375/260
(Continued)

FOREIGN PATENT DOCUMENTS

CN    101141429 A    3/2008
CN    101155156 A    4/2008
(Continued)

OTHER PUBLICATIONS

International Search Report and Written Opinion for PCT/CN2012/086926.
(Continued)

*Primary Examiner* — Chandrahas Patel
(74) *Attorney, Agent, or Firm* — Kilpatrick Townsend & Stockton LLP (57) ABSTRACT

Methods and communication terminals for estimating noise in a multicarrier communication system, where multicarrier symbols are received that include pilot signals, channel properties are estimated based on the received multicarrier symbols, wherein the channel properties include channel properties of a subcarrier carrying one of the pilot signals, and the channel properties of the subcarrier carrying one of the pilot signals are mixed with the corresponding pilot signal to calculate a noise power for the corresponding subcarrier.

41 Claims, 6 Drawing Sheets

(51) Int. Cl.
  *H04L 25/03* (2006.01)
  *H04B 17/345* (2015.01)
  *H04L 5/00* (2006.01)
  *H04B 17/318* (2015.01)
  *H04B 17/336* (2015.01)

(52) U.S. Cl.
  CPC ............ *H04L 5/0023* (2013.01); *H04L 5/0048* (2013.01); *H04L 25/03866* (2013.01); *H04B 17/318* (2015.01); *H04B 17/336* (2015.01); *H04B 17/345* (2015.01)

(56) References Cited

U.S. PATENT DOCUMENTS

| | | | |
|---|---|---|---|
| 8,520,749 B2 * | 8/2013 | Dateki | 375/260 |
| 2010/0223522 A1 | 9/2010 | Duggan | |

FOREIGN PATENT DOCUMENTS

| | | |
|---|---|---|
| CN | 101953085 A | 1/2011 |
| CN | 102420796 A | 4/2012 |
| EP | 1928140 A2 | 4/2008 |
| EP | 2034638 A1 | 11/2009 |
| EP | 2579488 A1 | 4/2013 |
| WO | 2011088501 A1 | 7/2011 |
| WO | 2011148779 A1 | 12/2011 |
| WO | 2013091541 A1 | 6/2013 |

OTHER PUBLICATIONS

European Search Report of European counterpart application EP-12198279.7.
ETSI: "LTE: EvolvedUniversal Terrestrial Radio Access (E-UTRA); Physical channel and modulation; (3GPP TS 36.211 version 1 0.0.0 Release 1 0)", Internet Citation, Jan. 1, 2011, pp. 1-18, Retrieved from the Internet: URL:http://www.etsi.org/deliver/etsi_ts/136200_136299/136211/10.00.00_60/ts_136211 v1 OOOOOp.pdf [retrieved on Apr. 4, 2013].

* cited by examiner

METHODS AND APPARATUS FOR NOISE ESTIMATION OF COMMUNICATION TERMINALS

RELATED APPLICATIONS

This application claims the priority and benefit under Article 8 of Patent Cooperation Treaty of Chinese Patent Application No. 201110433739.8, filed on Dec. 21, 2011, the content of which is incorporated herein by reference in its entirety.

TECHNICAL FIELD

This disclosure relates to methods and apparatus for communication systems, and more particularly, to methods and apparatus in a communication terminal for estimating noise.

BACKGROUND

Orthogonal Frequency Division Multiplexing (OFDM) is one of the Multi-Carrier Modulation (MCM) technologies. OFDM divides a frequency channel or frequency carrier into multiple orthogonal sub-channels each associated with a frequency subcarrier and allows for transmission of sub-data streams in parallel at low rates as opposed to a single data stream over a single frequency carrier at a much higher rate. The low-rate sub-data streams each modulate one of the sub-carriers. At the receiving end, the received orthogonal subcarriers each carrying a sub-data stream can be separated from one another using appropriate techniques to reduce inter-channel interference (ICI) between the sub-channels. Because the bandwidth of each sub-channel is smaller than the bandwidth of the channel, fading in each sub-channel generally can be considered flat across the frequency bandwidth of that sub-channel. As a result, inter symbol interference may be eliminated. In addition, because the bandwidth of each sub-channel is only a small portion of the bandwidth of the original channel, channel equalization also becomes easier.

The Long Term Evolution (LTE) project is directed to developing wireless communications standards as an evolution from 3G technology. The project began at the 2004 3rd Generation Partnership Project (3GPP) Conference held in Toronto. LTE uses OFDM and MIMO (Multiple-Input Multiple-Output) technologies. With a 20 MHz spectral bandwidth, LTE can provide a downlink peak rate of 326 Mbit/s and an uplink peak rate of 86 Mbit/s. LTE can improve user experience at cell edges, increase cell capacities, and reduce system latencies.

An LTE network may include a number of cells, each corresponding to a geographical area. Within each cell, mobile devices such as mobile phones access network services such as phone services or Internet services through an interface station such as a base station, which is also referred to as eNode B in LTE terminology.

A mobile device often needs to measure the signal-to-noise ratio (SNR) or the noise in a received signal for the purposes of performing Minimum Mean Square Error (MMSE) equalization, computing Channel Quality Indicator (CQI), and so on. Because some neighbor cells in an LTE cellular network operate at the same center frequency, the noise power of a received signal can vary widely due to interference from the same-frequency neighbor cells. For such received signals, conventional methods for estimating the noise in an entire band cannot be used to measure the noise or to estimate the signal-to-noise ratio.

Conventional methods for estimating noise or signal-to-noise ratio in subcarriers or sub-channels include constellation diagram-based and idle subcarrier-based methods. For example, through a constellation diagram, noise or signal-to-noise ratio can be estimated based on expected values and variances derived from equalized data. Statistical error, however, may be significant when a high-order modulation is used on a physical channel or when the signal-to-noise ratio is relatively low. Therefore, estimating noise or signal-to-noise ratio using a constellation diagram does not perform well with a large dynamic range of signal-to-noise ratio.

Alternatively, an idle subcarrier carrying no signal can be used to estimate the noise power. Channel estimate of a subcarrier carrying signals provides the signal power. Thus, the signal-to-noise ratio can be calculated by comparing the noise power and the signal power. Noise estimation based on an idle subcarrier, however, assumes uniform noise level across sub-bands and does not provide for accurate calculation of signal-to-noise ratio for a sub-band consisting of multiple subcarriers, when noise varies widely within a sub-band.

International Patent Application No. WO2011088501 (A1) provides another example of a conventional method for noise estimation and calculation of signal-to-noise ratio.

There is a need for a noise estimation method that performs well over a large dynamic range of signal-to-noise ratio, and/or provides an accurate measurement of signal-to-noise ratio for each sub-channel.

SUMMARY

According to a first aspect of the present disclosure, there is provided a method in a communication terminal for estimating noise in a multicarrier communication system, wherein communication in the multicarrier communication system is carried out over a plurality of subcarriers. The method comprises receiving multicarrier symbols, the multicarrier symbols including pilot signals; estimating channel properties based on the received multicarrier symbols, wherein the channel properties include channel properties of a subcarrier carrying one of the pilot signals; and mixing the channel properties of the subcarrier carrying one of the pilot signals with a corresponding pilot signal to calculate a noise power for a corresponding subcarrier.

According to a second aspect of the present disclosure, there is provided a communication terminal in a multicarrier communication system, wherein communication in the multicarrier communication system is carried out over a plurality of subcarriers. The apparatus includes a receiver receiving multicarrier symbols, the multicarrier symbols including pilot signals; an estimator coupled to receive the multicarrier symbols and to estimate channel properties based thereon, wherein the channel properties include channel properties of a subcarrier carrying one of the pilot signals; and a mixer coupled to mix the estimated channel properties of the subcarrier carrying one of the pilot signals with a corresponding pilot signal to calculate a noise power for a corresponding subcarrier.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the subject matter and, together with the description, serve to explain the principles of the subject matter.

DETAILED DESCRIPTION OF THE DISCLOSURE

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Consistent with embodiments of the present disclosure, in a multicarrier communication system where communication terminals communication over multiple subcarriers, pilot signals or reference signals transmitted on one or more of the subcarriers can be used to estimate the noise level and to calculate the signal-to-noise ratio in the received signals. In particular, pilot signals or reference signals are known signals transmitted for reference purposes such as channel detection or channel estimation. A communication terminal receiving multicarrier signals containing pilot signals can combine the pilot signals with channel estimation of the subcarriers carrying the pilot signals to estimate the signal power and noise power, and to further calculate the signal-to-noise ratio. In addition, consistent with embodiments of the present disclosure, noise power and signal-to-noise ratio calculated for certain subcarriers carrying pilot signals can be further used to estimate the noise power or signal-to-noise ratio for other subcarriers within the same sub-band through, for example, averaging or linear/nonlinear interpolation or extrapolation.

Embodiments described below use LTE systems and devices as an example. In an LTE system, communication terminals, such as mobile phones or, more generally, user equipment (UE), communicate with base stations or eNode Bs to access network services such as telephone services, Internet, data streaming, etc. An LTE system can implement either Time Division Duplex (TDD) or Frequency Division Duplex (FDD). In TDD, communications in two opposite directions between the base station and mobile phones occur in the same frequency band but different time slots. In FDD, communications in two opposite directions between the base station and mobile phones occur at the same time but in different frequency bands.

It is to be understood, however, that technologies described herein can be equally applied to such other OFDM systems as WiFi or WiMAX systems or other multi-carrier systems. The theories and applications of OFDM and/or multicarrier technologies are well known in the art and a background discussion thereof is therefore not provided here.

Figure 1:
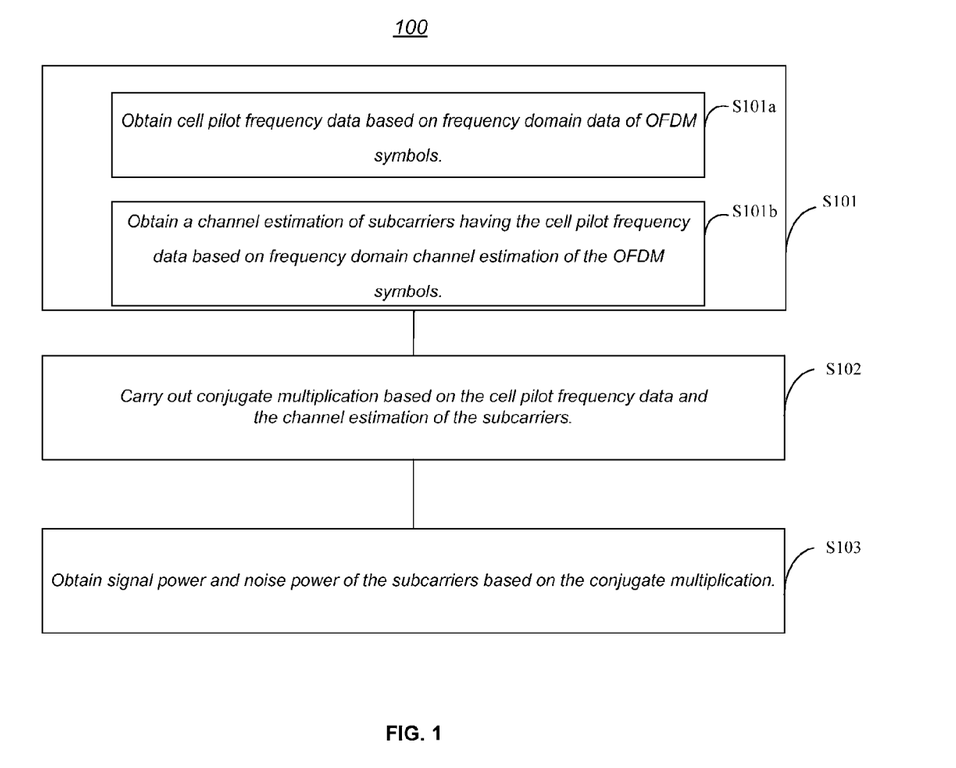
FIG. 1 illustrates a method for estimating noise in a communication terminal, according to an exemplary embodiment.

FIG. 1 illustrates a method 100 in a communication terminal for estimating noise in received OFDM symbols, according to an exemplary embodiment. The communication terminal recovers frequency domain data from the received OFDM symbols and also includes a channel estimator that estimates frequency domain channel properties based on the received OFDM symbols, which are not shown in the figure. In step S101, the communication terminal obtains cell pilot data from the frequency domain data and a channel estimation of those subcarriers having the cell pilot data from frequency domain channel estimation of the OFDM symbols. In an MIMO configuration, multiple transmitting antennas may transmit pilot data and multiple receiving antennas may receive copies of the same transmitted signals, in which case the communication terminal can identify, in step S101, the pilot data associated with a particular transmitting antenna and received at a particular receiving antenna by an identification, such as an index, of the transmitting and/or receiving antennas.

In step S102, the communication terminal performs a conjugate multiplication of the cell pilot data with the channel estimation of the subcarrier carrying the pilot data. In step S103, the communication terminal calculates the signal power and noise power of the subcarrier carrying the pilot data based on the conjugate multiplication.

More detailed explanation of the steps shown in FIG. 1 is provided below. One of ordinary skill in the art would appreciate that the illustrated procedures can be modified to add or delete steps without deviating from the spirit of the invention.

As shown in FIG. 1, step S101 can include two sub-steps, i.e., a sub-step S101a and a sub-step S101b. In sub-step S101a, the communication terminal obtains the cell pilot data that correspond to the receiving antennas of the communication terminal and the transmitting antennas from the frequency domain data of the received OFDM symbols. In sub-step S101b, the communication terminal obtains the channel estimation of those subcarriers having the cell pilot data from the frequency domain channel estimation calculated based on the OFDM symbols. In some embodiments, sub-steps S101a and S101b can be carried out at the same time or substantially the same time. Sub-steps S101a and S101b will be described in detail below.

From each of the received OFDM symbols, the communication terminal can obtain the frequency domain data and calculate the frequency domain channel estimation of the subcarriers. Methods of obtaining frequency domain data and generating frequency domain channel estimation from time domain signals would be apparent to those skilled in the art. For example, the communication terminal may perform a Fast Fourier Transformation (FFT) to convert received OFDM symbols, which are in the time domain, into frequency domain data. Likewise, the communication terminal may include an estimator to estimate channel properties of the subcarriers. The estimator may implement any conventional statistical model suitable for channel estimation, such as least-square estimation, MMSE estimation, etc. Accordingly, the methods of obtaining frequency domain data and frequency domain channel estimation will not be described in detail here. The frequency domain data may include subcarrier data (i.e., data carried on each subcarrier), the index of the receiving antenna, the index of the received OFDM symbol, and/or the index of the subcarrier. The frequency domain channel estimation may also include such indices as mentioned in addition to the estimated channel properties. In addition, the frequency domain channel estimation may also include the index of the transmitting antenna.

As described above, LTE can include either a Time Division Duplex (TDD) LTE or a Frequency Division Duplex (FDD) LTE. Thus, in an LTE system, signal transmissions can have two different frame structures. In both FDD and TDD LTE, a radio frame is 10 milliseconds (ms). In FDD, a frame is divided into 10 subframes and each subframe is further divided into 2 time slots. Each subframe is 1 ms and each time slot is 0.5 ms. In TDD LTE, a frame is divided into 2 half-frames, each half-frame is divided into 5 subframes, and each subframe contains 2 time slots. Each half-frame is 5 ms, each subframe is 1 ms, and each slot is 0.5 ms. The two time slots within each subframe are referred to as the even-numbered slot and the odd-numbered slot, respectively.

Each time slot may contain a number of OFDM symbols. As is well known in the art, an OFDM symbol includes a cyclic prefix, which is a repetition of an end portion of the symbol, to combat multipath effects. The number of OFDM symbols in each time slot thus depends on the length of the cyclic prefix (CP). In LTE, when a normal cyclic-prefix (Normal CP) is used, one time slot contains 7 OFDM symbols; when an extended cyclic-prefix (Extended CP) is used, one time slot contains 6 OFDM symbols.

Figure 2:
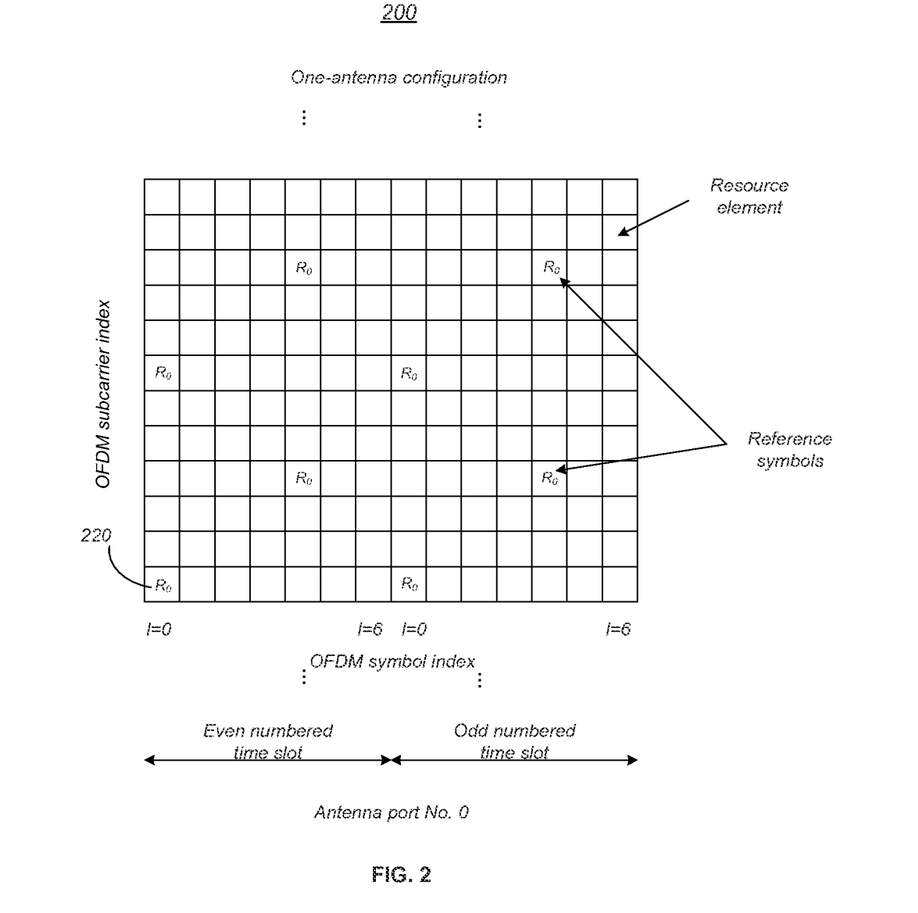
FIG. 2 illustrates a symbol-subcarrier diagram showing the distribution of cell reference symbols in a normal cyclic prefix scheme with a one-antenna configuration, according to an exemplary embodiment.

FIG. 2 shows a two-dimensional resource grid 200 for LTE networks, where the horizontal dimension reflects OFDM symbols in time and the vertical dimension reflects subcarriers. An OFDM symbol is transmitted over a number of subcarriers for a time duration called a symbol period. A basic resource unit in LTE is defined as one subcarrier per OFDM symbol time period and is referred to as a Resource Element (RE). An RE is the smallest block on the 2-dimensional symbol-subcarrier grid.

With the symbol-subcarrier grid and resource elements defined thereon, data can be identified with reference to the position of the corresponding resource elements on the grid. As is well known in the art, an OFDM symbol, which is a time domain waveform, generally contains some form of data in the frequency domain, i.e., data carried over the various subcarriers. In a MIMO configuration, frequency domain data over a particular subcarrier in an OFDM symbol can be expressed as DataAftFft_j_l(k), where j is the receiving antenna index, l is the OFDM symbol index in the subframe, and k is the subcarrier index. Similarly, frequency domain channel estimation may be expressed as FreqCheData_p_j_l (k), where p is the transmitting antenna index. Both the frequency domain data DataAftFft_j_l(k) and the frequency domain channel estimation FreqCheData_p_j_l(k) are complex numbers.

Figure 3:
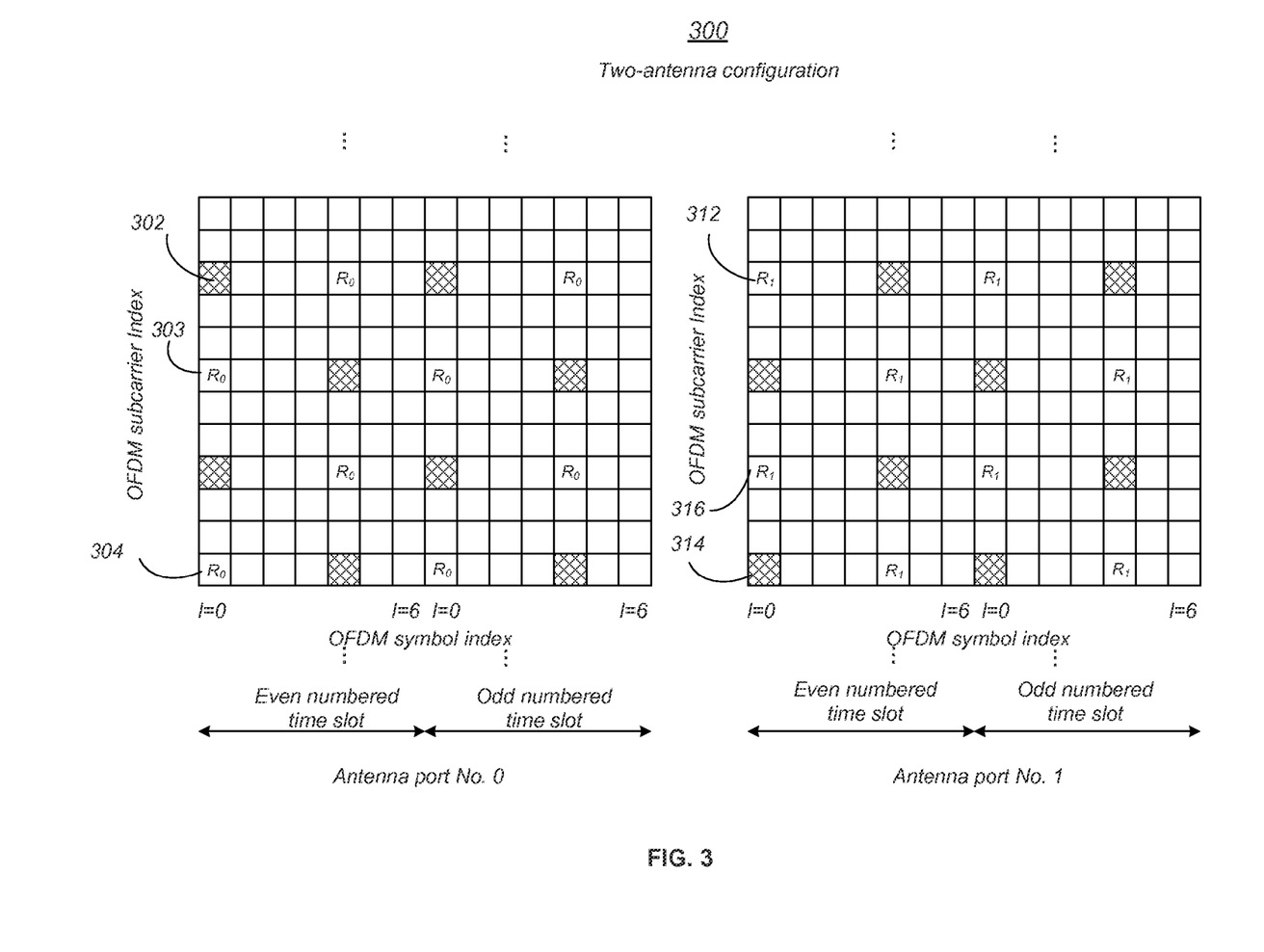
FIG. 3 illustrates a symbol-subcarrier diagram showing the distribution of cell reference symbols in a normal cyclic prefix scheme with a two-antenna configuration, according to another exemplary embodiment.
Figure 4:
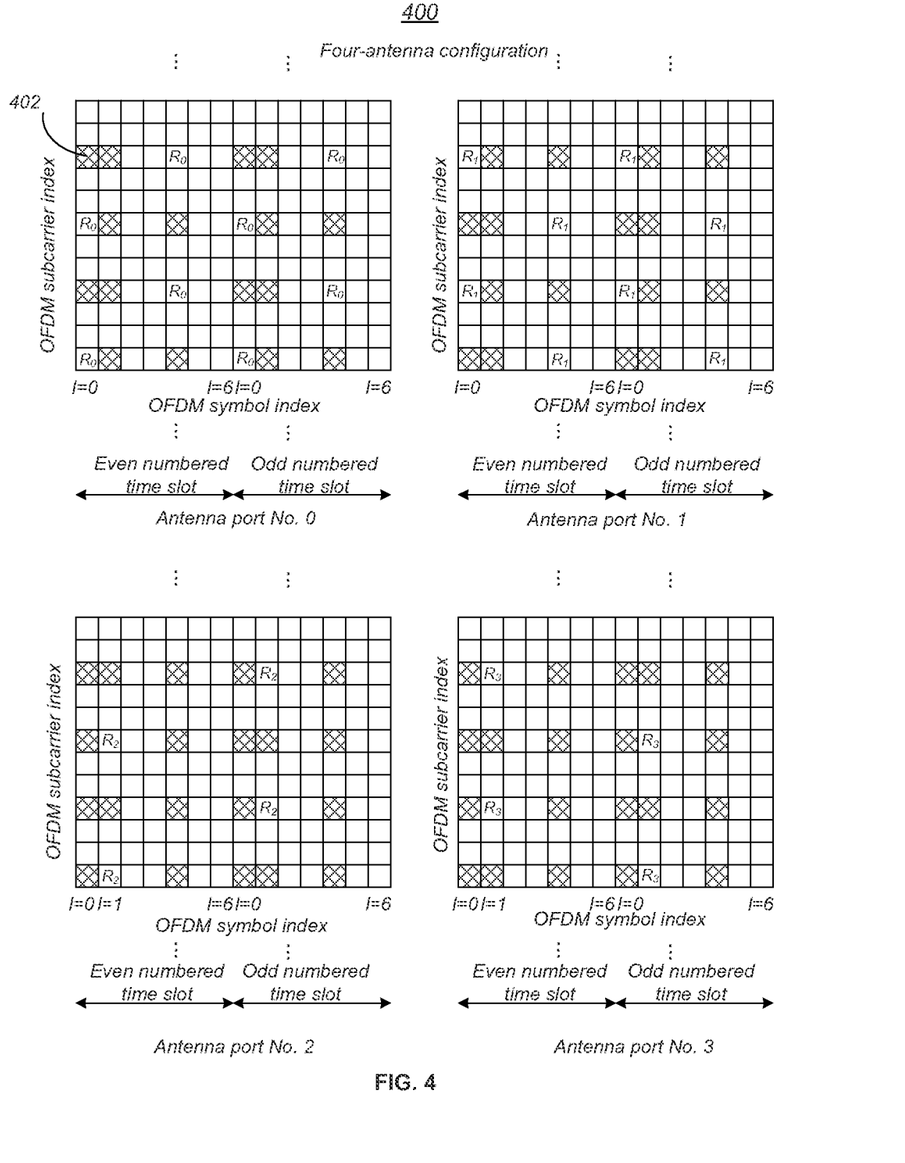
FIG. 4 illustrates a symbol-subcarrier diagram showing the distribution of cell reference symbols in a normal cyclic prefix scheme with a four-antenna configuration, according to another exemplary embodiment.

Pilot signals, also referred to as reference signals (RS), are known signals for purposes of channel estimation or channel detection. In an LTE network, the base station or eNode B in each cell periodically transmits pilot signals such that the mobile phones or UE can detect the cell and estimate channel properties in that cell. Pilot signals are embedded in OFDM symbols transmitted by eNode B. FIGS. 2-4 illustrate some exemplary arrangements of pilot signals on the symbol-subcarrier grid for eNode B transmissions with the normal cyclic prefix scenario.

Symbol-subcarrier grid 200 in FIG. 2 shows the distribution of the cell reference signals with a one-antenna configuration for eNode B transmissions, e.g., antenna port No. 0. In the time dimension, OFDM symbols have indices 0 through 6 in every time slot, with two slots shown in FIG. 2. Although the exact index numbers are not shown in the figure, subcarriers in the subcarrier dimension (vertical) are also indexed.

As shown in FIG. 2, in the horizontal direction, a subframe is divided into two time slots, namely, the even-numbered slot and the odd-numbered slot. With the normal cyclic prefix shown in FIG. 2, each time slot has 7 OFDM symbols, with indices l=0, l=1, . . . l=6, respectively. In the vertical direction, 12 subcarriers are shown in FIG. 2. Reference signals or pilot signals may comprise multiple reference symbols each occupying one resource element. As an example, in FIG. 2, $R_0$ (reference numeral 220) indicates reference symbols that are transmitted along with data in other resource elements from antenna port No. 0.

In the particular example shown in FIG. 2, in each time slot, reference symbols $R_0$ are distributed in two OFDM symbols with indices l=0 and l=4. In the first OFDM symbol (l=0), reference symbols $R_0$ are carried over the first and seventh subcarriers from the bottom. In the fifth OFDM symbol (l=4), reference symbols $R_0$ are carried over the fourth and tenth subcarriers. In the extended cyclic prefix configuration, which is not shown in the figure, where each time slot has only 6 OFDM symbols, reference symbols may be distributed in the first and fourth (as opposed to fifth) OFDM symbols with indices l=0 and l=3. Reference symbols in the first OFDM symbol of each time slot allows early detection and demodulation of downlink transmissions, i.e., transmissions from the base station or eNode B to the mobile devices.

FIG. 3 illustrates a symbol-subcarrier diagram 300 showing the distribution of cell reference symbols for a two-antenna configuration. In other words, a base station in a cell transmits signals over two antennas, e.g., antenna port No. 0 and antenna port No. 1. In FIG. 3, the symbol-subcarrier diagrams for antenna ports No. 0 and No. 1 are shown separately. In FIG. 3, the distribution of reference symbols for antenna port No. 0 is the same as that shown in FIG. 2, while the distribution of reference symbols for antenna port No. 1 differs from that of antenna port No. 0.

FIG. 3 also shows that some resource blocks (e.g., reference numerals 302, 314) are shaded, indicating no transmission from an antenna. For example, the base station or eNode B transmits no signal from antenna port No. 0 on the fourth subcarrier in the first OFDM symbol, which coincides with a transmission of reference symbol $R_1$ (reference numeral 316) in that same resource element. Likewise, when reference symbol $R_0$ is transmitted from antenna port No. 0 on the first subcarrier in the first OFDM symbol, the base station does not transmit any signal from antenna port No. 1. Because the multiple antennas transmit at the same frequencies, silencing one antenna while transmitting reference symbols from the other antenna is necessary to avoid mutual interferences.

FIG. 4 illustrates a symbol-subcarrier diagram 400 showing the distribution of cell reference symbols for a four-antenna configuration, i.e., antenna port Nos. 0-3. In FIG. 4, the distributions of reference symbols for antenna port Nos. 0 and 1 are the same as those shown in FIG. 3, while the distributions of reference symbols for antenna port Nos. 2 and 3 are different. In the particular example shown in FIG. 4, reference symbols transmitted from antenna port Nos. 2 and 3, labeled in the figure respectively as $R_2$ and $R_3$, are transmitted in one OFDM symbol per time slot as opposed to two OFDM symbols in the case of antenna port Nos. 0 and 1. For example, for antenna port No. 2, reference symbols $R_2$ are in the second OFDM symbol (l=1) of each time slot.

Similar to what FIG. 3 shows, in FIG. 4, shaded blocks, such as block 402, indicate no transmission from the current antenna port in a particular resource element. And, to avoid interference, when reference symbols are transmitted from one of the four antennas, the other three antennas are silent.

As illustrated in FIGS. 2-4, not all OFDM symbols in the received data include reference symbols or pilot signals. An OFDM symbol that does contain pilot signal or data or the reference symbols can be used for noise estimation. One of ordinary skill in the art would appreciate that the distribution of the reference symbols described above is for illustration only and the reference symbols can have other distributions.

Table 1 provides further examples of when reference symbols are transmitted in various antenna and cyclic prefix configurations. Particularly, the table shows the OFDM symbols containing reference symbols in a subframe separately for normal cyclic prefix and extended cyclic prefix configurations and also separately for one-antenna, two-antenna, and four-antenna configurations. In the table, index l indicates the position of the OFDM symbol in the subframe (not the time slots), index p identifies the antenna. Thus, in the normal CP, two-antenna configuration, reference symbols or pilot data are transmitted on both antennas (p=0, 1) in the first (l=0), fifth (l=4), eighth (l=7), and twelfth (l=11) OFDM symbols, which correspond to the first and fifth OFDM symbols in both time slots of the subframe.

TABLE 1

| Cyclic Prefix (CP) | Antenna Configuration | OFDM symbols Containing Cell Pilot Data/ Reference Symbols |
|---|---|---|
| Normal CP | 1 | 0(p = 0), 4(p = 0), 7(p = 0), 11(p = 0) |
| Normal CP | 2 | 0(p = 0, 1), 4(p = 0, 1), 7(p = 0, 1), 11(p = 0, 1) |
| Normal CP | 4 | 0(p = 0, 1), 1(p = 2, 3), 4(p = 0, 1), 7(p = 0, 1), 8(p = 2, 3), 11(p = 0, 1) |
| Extended CP | 1 | 0(p = 0), 3(p = 0), 6(p = 0), 9(p = 0) |
| Extended CP | 2 | 0(p = 0, 1), 3(p = 0, 1), 6(p = 0, 1), 9(p = 0, 1) |
| Extended CP | 4 | 0(p = 0, 1), 1(p = 2, 3), 3(p = 0, 1), 6(p = 0, 1), 7(p = 2, 3), 9(p = 0, 1) |

When estimating noise for a channel, the communication channel may first identify the transmitting antenna and then the OFDM symbols containing the corresponding pilot data or reference symbols. Once the locations of the OFDM symbols in the time frame are determined, the communication terminal may extract the OFDM symbols received at each receiving antenna for further processing. Thus, pilot data can be expressed as RxCellRsPilot_j_p_l(i), with receiving antenna index j, transmitting antenna index p, and OFDM symbol index l within a subframe, and i is an index of subcarrier carrying pilot data.

In the examples shown in FIGS. 2-4, pilot data are regularly distributed in time and frequency. In frequency, for example, pilot data are transmitted on every sixth subcarrier. As an illustration, in FIG. 3, pilot data are transmitted on antenna port No. 0 on the first and seventh subcarriers in the first OFDM symbol. Thus, cell pilot data RxCellRsPilot_j_p_l(i) can be expressed in terms of frequency domain data DataAftFft_j_l: RxCellRsPilot_j_p_l(i)=DataAftFft_j_l (k0_p_l+ 6*i), where i=0, 1, 2 . . . 2*N_Dl_Rb−1, where j is the receiving antenna index, l is the OFDM symbol index, and p is the transmitting antenna index. In addition, in the formula, N_Dl_Rb refers to the number of resource blocks on the downlink, where each resource block, as defined in LTE, is a block of resource elements spanning one time slot and 12 subcarriers on the downlink. Also, k0_p_l represents the beginning position of a pilot frequency signal and can be obtained by a modulo operation defined as k0_p_l=(v_p_+ $v_{shift}$) mod 6, where v_p_l and $v_{shift}$ are determined as follows. In FIGS. 2-4, for example, k0_p_l can be 0 or 3.

$$v_{shift} = N_{ID}^{cell} \bmod 6$$

$$v\_p\_l = \begin{cases} 0 & \text{if } p = 0 \text{ and } l' = 0 \\ 3 & \text{if } p = 0 \text{ and } l' \neq 0 \\ 3 & \text{if } p = 1 \text{ and } l' = 0 \\ 0 & \text{if } p = 1 \text{ and } l' \neq 0 \\ 3(n_s \bmod 2) & \text{if } p = 2 \\ 3 + 3(n_s \bmod 2) & \text{if } p = 3 \end{cases}$$

In the above expression, v_p_l is the offset determined by the transmitting antenna and the OFDM symbol, $N_{ID}^{cell}$ is the cell identity, $v_{shift}$ calculates the shift of reference symbols in position based on cell identity $N_{ID}^{cell}$, $n_s$ is the slot number within a radio frame. $n_s$ can be obtained as the quotient part when l is divided by the N_Dl_Symb, number of OFDM symbols in an LTE downlink time slot. l' is the remainder part when divided by N_Dl_Symb. More detailed descriptions of the above expressions can be found in §6.10.1.2 of 3GPP Technical Specification 36.211.

Referring back to FIG. 1, after obtaining cell pilot data and channel estimation of subcarriers at step S101, in step S102, the communication terminal performs a conjugate multiplication. In some exemplary embodiments, step S102 can include a substep (not shown) for descrambling the cell pilot data, and then a substep (not shown) for carrying out conjugate multiplication of the channel estimation of the subcarriers carrying the pilot data with the descrambled cell pilot data.

Scrambling and descrambling are techniques used in telecommunications to provide data security, where pseudorandom code sequences, referred to as scrambling codes or scrambling sequences, can be used to manipulate data before transmission and after reception. Thus, in some embodiments, descrambling of the cell pilot data may include generating a complex scrambling code sequence, and then descrambling the cell pilot data using the complex scrambling code sequence. As an example, the cell pilot data RxCellRsPilot_j_p_l(i), as obtained in step S101, can be descrambled with respect to each receiving antenna j, each transmitting antenna p, and each OFDM symbol l. In order to carry out the descrambling, a complex scrambling code sequence is first generated. The method of generating complex scrambling code sequence can be the same as or similar to that of generating a reference signal sequence as defined in §6.10.1.1 of the 3GPP Technical Specification 36.211. For example, the complex scrambling code sequence can be expressed as Pn_p(m), m=0, 1, 2, . . . 2*N_max_Dl_Rb−1, where the N_max_Dl_Rb is the maximum number of resource blocks on the downlink and is set to be 110 for an LTE system.

After the complex scrambling code sequence is generated, the cell pilot data can be descrambled to generate descrambled cell pilot data: PilotAftDescramble_j_p_l(i)= RxCellRsPilot_j_p_l(i)*conj(Pn_p(N_max_Dl_Rb− N_Dl_Rb+i)), where "conj" represents a complex conjugation operation.

The communication terminal then performs the conjugate multiplication to separate signal from noise. Although the channel estimation of the subcarriers, as obtained in step S101$b$, reflects the characteristics of the current channel, the signal and the noise are mingled together and need to be separated. In some embodiments, the signal and the noise in the subcarriers are separated by carrying out conjugate multiplication of the channel estimation of the subcarriers with the descrambled cell pilot data.

In a first exemplary embodiment, the conjugate multiplication can be carried out by performing a conjugate operation on the channel estimation of the subcarriers, followed by a complex multiplication of the descrambled cell pilot data with the conjugation of the channel estimation of the subcarriers, as follows: ChanPowAndNoise_j_p_l(i)=PilotAftDescramble_j_p_l(i)*conj(FreqCheData_p_j_l(k)), where PilotAftDescramble_j_p_l(i) is the descrambled cell pilot data, FreqCheData_p_j_l(k) is the channel estimation of the subcarriers, and k=l*6+k0_p_l.

Alternatively, in a second exemplary embodiment, the conjugate multiplication can be carried out by performing a conjugate operation of the descrambled cell pilot data, followed by a complex multiplication operation of the conjugation of the descrambled cell pilot data with the channel estimation of the subcarriers, as follows: ChanPowAndNoise_j_p_l(i)= conj(PilotAftDescramble_j_p_l(i))*FreqCheData_p_j_l(k).

One of ordinary skill in the art would appreciate that alternative or additional operations may also be carried out in order to obtain separated signals and noises of the subcarriers.

Referring still to FIG. 1, in some other exemplary embodiments, step S102 can comprise a substep (not shown) for scrambling the obtained channel estimation of the subcarriers, and then a substep (not shown) for carrying out a conjugate multiplication of the cell pilot data with the scrambled channel estimation of the subcarriers. In particular, the communication terminal may first generate a complex scrambling code sequence, and then scramble the channel estimation of the subcarriers using the complex scrambling code sequence. The complex scrambling code sequence is the same as that used for scrambling of the cell pilot data RxCellRsPilot_j_p_l (i), as described above. After scrambling the channel estimation, the communication terminal performs a conjugate multiplication to separate signal from noise.

Likewise, conjugate multiplication may be carried out either by first performing a conjugate operation on the scrambled channel estimation, followed by a complex multiplication of the cell pilot data with the conjugation of the scrambled channel estimation; or by first performing a conjugate operation on the cell pilot data, followed by a complex multiplication of the conjugation of the cell pilot data with the scrambled channel estimation of the subcarriers. One of ordinary skill in the art would appreciate that alternative or additional operations may also be carried out in order to obtain separated signals and noises of the subcarriers.

As shown in FIG. 1, after the conjugate multiplication, the communication terminal can, in step S103, separate out signal from noise based on the results of the multiplication. For example, signal power may be determined based on an absolute value of a real part of the conjugate multiplication results, and noise power may be determined based on an absolute value of an imaginary part of the conjugate multiplication results.

As described above, the result of the complex conjugate multiplication in step S102 may be expressed as ChanPowAndNoise_j_p_l(i). Thus, in some embodiments, the signal power of the subcarriers carrying pilot data may be determined as ChanPow_j_p_l(i)=|real (ChanPowAndNoise_ j_p_l(i))|, where the real( ) operation calculates the real part of a complex value and the "| |" operation calculates an absolute value of a number or value. Similarly, the noise power of the subcarrier can be expressed as ChanNoise_j_p_l (i)=|imag (ChanPowAndNoise_j_p_l(i))|, where the imag( ) operation calculates the imaginary part of a complex number.

In some instances, for example, when the signal-to-noise ratio is high, the signal power may be simply expressed as ChanPow_j_p_l(i)=real (ChanPowAndNoise_j_p_l(i)), without having to calculate the absolute value of the real part of the signal and noise power.

In the embodiments described above, the communication terminal calculates, in a particular OFDM symbol, the noise and/or signal powers of the subcarriers carrying pilot data by mixing (e.g., conjugate multiplication, scrambling, descrambling, etc.) cell pilot data and the channel estimation of the subcarriers carrying such cell pilot data. Consistent with embodiments of the present disclosure, the communication terminal may, based on the noise and/or signal powers for the subcarriers carrying cell pilot data, further determine the noise figure, such as the noise power, signal power, or signal-to-noise ratio, for other subcarriers, a sub-band of subcarriers, or even the entire OFDM band comprising all of the subcarriers in the system, or other OFDM symbols not containing pilot data. Note that, for system configuration and resource allocation purposes, an OFDM band containing multiple subcarriers may be divided into sub-bands each containing a number of subcarriers.

Consistent with embodiments of the present disclosure, the communication terminal may use statistical models or means to determine the noise figure for subcarriers or OFDM symbols not carrying pilot data, sub-bands, or entire OFDM band. For example, the communication terminal can compute sums or averages of the signal power and the noise power, respectively, across the subcarriers having the cell pilot data, calculate a signal-to-noise ratio based on such sums or averages, and then directly or indirectly use the calculated signal-to-noise ratio as the noise figure for the entire OFDM band or at least the sub-band where the subcarriers carrying the cell pilot data belong.

As an example, assuming that the sub-band is represented by an index q and the indices of the subcarriers that have the cell pilot data are represented by q Set, then the sum of the signal power and the noise power may be expressed as:

$$\text{SubbandPow\_j\_p\_l}(q) = \sum_{i \in q \, Set} \text{ChanPow\_j\_p\_l}(i),$$

and $$\text{SubbandNoise\_j\_p\_l}(q) = \sum_{i \in q \, Set} \text{ChanNoise\_j\_p\_l}(i),$$

where j is the receiving antenna index, l is the OFDM symbol index, p is the transmitting antenna index, and i can be any index value that belongs to the q Set. The average of the signal power and the noise power may be similarly calculated by taking the average, instead of the sum, of the signal power ChanPow_j_p_l(i) and the noise power ChanNoise_j_p_l(i), where i belongs to the q Set.

In some exemplary embodiments, a signal-to-noise ratio calculated by comparing the sum/average of the signal power to the sum/average of the noise power may be directly considered the signal-to-noise ratio of the entire OFDM band, a sub-band, or a different OFDM symbol. As an example, the signal-to-noise ratio of a sub-band may be expressed as SubbandSnr_j_p_l(q)=SubbandPow_j_p_l(q)/SubbandNoise_j_p_l(q), where j is the receiving antenna index, l is the OFDM symbol index, p is the transmitting antenna index, and q is the sub-band index.

Alternatively, the signal and noise powers of the subcarriers carrying cell pilot data may be further processed for a better representation of the signal/noise powers of the entire OFDM band or a sub-band. For example, the signal power, noise power, or signal-to-noise ratio calculated for the subcarriers carrying pilot data may be smoothed to reflect fluctuations in frequency response across subcarriers and better represent the characteristics of another subcarrier, a sub-band, an entire OFDM band, or other OFDM symbols not containing pilot data. Smoothing can be done in many ways, such as averaging or filtering, linear combination, non-linear interpolation or extrapolation, etc. Common statistical tools, such as least squares (LS), minimum mean squared error (MMSE), etc., can be used. In some embodiments, smoothing can be performed based on the receiving antenna j, the transmitting antenna p, the separation of OFDM symbol l from the OFDM symbols having cell pilot data, locations of the subcarriers carrying cell pilot data with respect to other subcarriers.

In particular, in some exemplary embodiments, the sub-band noises can be summed or averaged, followed by smoothing or filtering operations, to represent the noise for the sub-band, or other subcarriers, or the entire OFDM band, or a different OFDM symbol.

In some other embodiments, when only noise power is needed, SubbandNoise_j_p_l(q) can be smoothed or averaged with respect to the receiving antenna j, the transmitting antenna p, and the OFDM symbol l corresponding to the OFDM symbols having the cell pilot data. The result may be expressed as SubbandNoise(q), where q is the sub-band index, and output as the sub-band noise.

One of ordinary skill in the art would appreciate that the sub-band signal-to-noise SubbandSnr_j_p_l(q) and the sub-band noise SubbandNoise_j_p_l(q) may vary according to the receiving antenna index j, the transmitting antenna index p, and the OFDM symbol index l. Therefore, depending on the measurement requirements and available resources, the smoothing or averaging operation, as performed with respect to the indices j, p, and l, may be applied to either a portion of or all the values of the sub-band signal-to-noise SubbandSnr_j_p_l(q) and the sub-band noise SubbandNoise_j_p_l(q).

In some other exemplary embodiments, the signal power and noise power of the subcarriers carrying pilot data may be summed or averaged and then smoothed for generating a noise figure for the OFDM band or a sub-band of the OFDM band. As an example, before acquiring sub-band signal power SubbandPow_j_p_l(q) and sub-band noise power SubbandNoise_j_p_l(q), subcarrier signal power ChanPow_j_p_l(i) and subcarrier noise power ChanNoise_j_p_l(i) can be averaged, smoothed, and/or filtered. The averaging, smoothing, and/or filtering can be carried out by, for example, using one-dimensional filtering with respect to index i, two-dimensional filtering with respect to both index l and index i, or two one-dimensional filterings separately with respect to index l and index i. In another example, the one- or two-dimensional filtering can be carried out on either subcarrier signal power ChanPow_j_p_l(i) or subcarrier noise power ChanNoise_j_p_l(i). One of ordinary skill in the art would appreciate that the above described examples are not exhaustive and the averaging, smoothing, and/or filtering can be carried out in any other desired manner.

After the averaging, smoothing, and/or filtering are carried out on the subcarriers' noise power and signal power, sub-band signal power SubbandPow_j_p_l(q) and sub-band noise power SubbandNoise_j_p_l(q) can be acquired, and sub-band signal-to-noise ratio SubbandSnr_j_p_l(q) can, in turn, be acquired. Moreover, the sub-band signal-to-noise ratio SubbandSnr_p_l(q) can be further averaged, smoothed, and/or filtered with respect to each sub-band q, each receiving antenna j, each transmitting antenna p, and each OFDM symbol l corresponding to the OFDM symbols having the cell pilot data.

In some exemplary embodiments, the method for estimating noise of a communication terminal further comprises modifying, correcting, or rectifying the signal power based on the noise power. The modification, correction, or rectification may occur after the signal power and noise power have been determined for the subcarriers carrying cell pilot data. For example, the subcarrier signal power ChanPow_j_p_l(i) can be modified, corrected, or rectified based on the subcarrier noise power ChanNoise_j_p_l(i). In one embodiment, the modification, correction or rectification can be done by a modulus operation, e.g., ChanPow_j_p_l(i)=|ChanPow_j_p_l(i)−Alpha*ChanNoise_j_p_l(i)|, where "Alpha" is a weighing factor with a value between 0 and 1.

Figure 5:
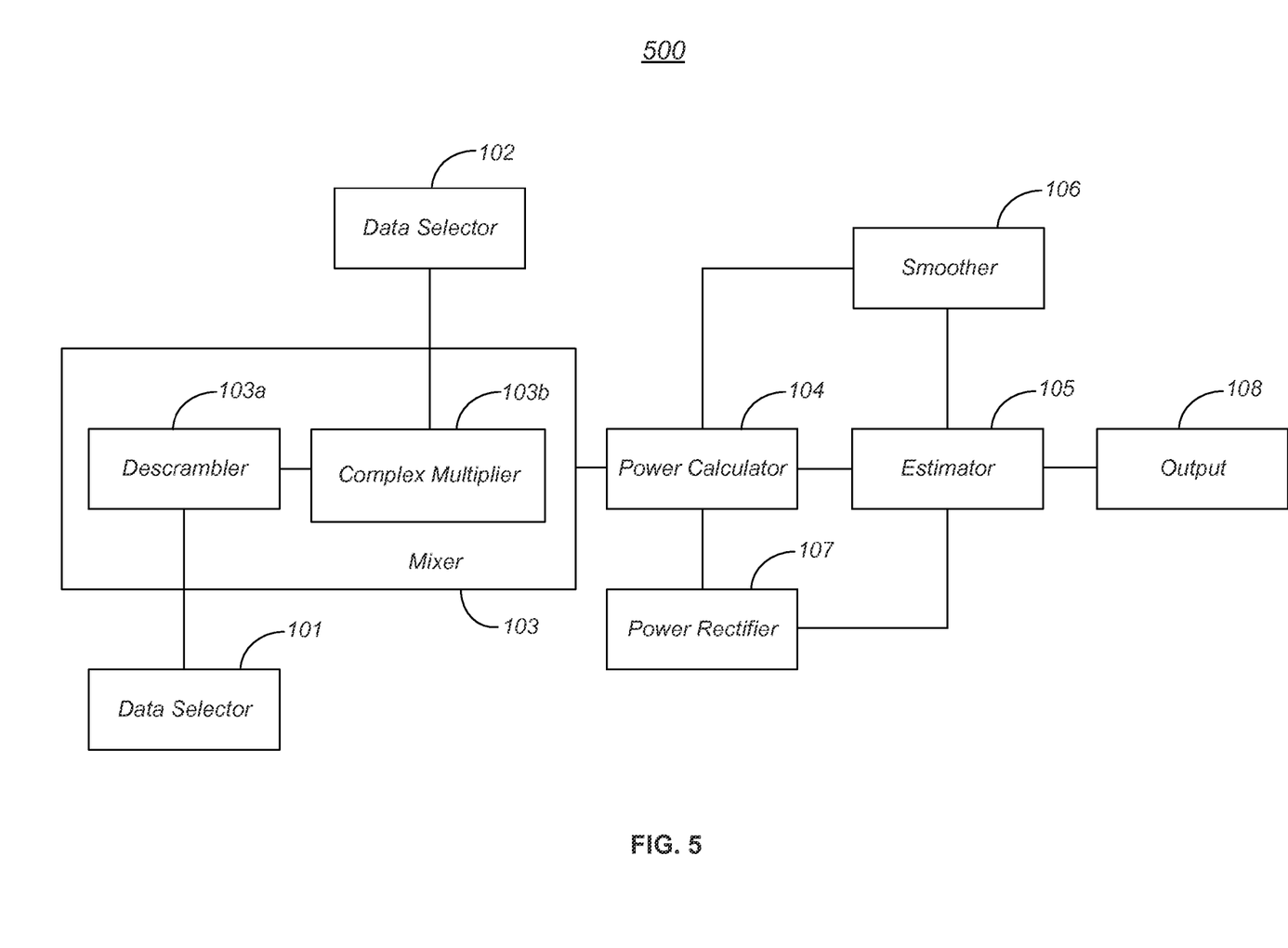
FIG. 5 illustrates an exemplary block diagram showing components for noise estimation in an apparatus consistent with an embodiment.

FIG. 5 is an exemplary block diagram of a communication terminal, such as apparatus 500, showing components for estimating noise consistent with embodiments of the present disclosure. As shown in FIG. 5, apparatus 500 includes a first data selector 101 that identifies or extracts cell pilot data from the frequency domain data in received OFDM symbols; a second data selector 102 that identifies or extracts a channel estimation of subcarriers having cell pilot data from the frequency domain channel estimation of the OFDM symbols; a mixer 103 that mixes the cell pilot data with the channel estimation of the subcarriers carrying cell pilot data; and a power calculator 104 that calculates signal power and noise power from the output of mixer 103. Mixer 103 is coupled to first data selector 101 and second data selector 102. Power calculator 104 is coupled to mixer 103. As discussed above, the frequency domain data may include subcarrier data, receiving antenna indices, OFDM symbol indices, and subcarrier indices. The operating modes of the communication terminals may include at least one of LTE, WiMAX, and WiFi. One of ordinary skill in the art would appreciate that the illustrated diagram can be altered to delete blocks or further include additional blocks.

Referring to FIG. 5, in some embodiments, first data selector 101 can include a determination unit (not shown) to determine whether a received OFDM symbol contains cell pilot data of a transmitting antenna of interest; and an acquiring unit (not shown) to extract the OFDM symbols containing cell pilot data for the transmitting antenna of interest and acquire subcarrier data of the subcarriers having cell pilot data, when the determination unit determines that the at least one of the OFDM symbols corresponds to the cell pilot data of the at least one transmitting antenna. The acquiring unit is coupled to the determination unit. In some embodiments, first data selector 101 can extract the cell pilot data, and second data selector 102 can extract the channel estimation of subcarriers at the same time or substantially the same time as first data selector 101 extracts the cell pilot data.

Although not shown in FIG. 5, apparatus 500 may further include one or more storage components such as a memory, latches, or registers that hold the cell pilot data and channel estimation identified and/or extracted by first data selector 101 and second data selector 102 for further processing by mixer 103. The storage components may be included within first data selector 101 and second data selector 102, or may be in a memory separate from but coupled to first data selector 101 and second data selector 102. The cell pilot data and channel estimation may be held in one storage component or separate storage components.

In FIG. 5, mixer 103 may include a descrambler 103a to descramble the cell pilot data, and a complex multiplier 103b coupled to descrambler 103a to perform a conjugate multiplication of the channel estimation of the subcarriers with the descrambled cell pilot data. Descrambling unit 103a is coupled to first data selector 101 to receive cell pilot data, and complex multiplier 103b is coupled to second data selector 102.

In some embodiments, mixer 103 may also include a scrambling code generator (not shown in FIG. 5) that generates a complex scrambling code sequence. Descrambler 103a descrambles the cell pilot data with the complex scrambling code sequence. After the cell pilot data is descrambled, complex multiplier 103b performs a conjugate operation on the channel estimation of the subcarriers, followed by a complex multiplication of the descrambled cell pilot data with the conjugation of the channel estimation of the subcarriers. Alternatively, complex multiplier 103b can perform a conjugate operation on the descrambled cell pilot data, followed by a complex multiplication of the conjugation of the descrambled cell pilot data with the channel estimation of the subcarriers.

Power calculator 104 may include a signal power calculator (not shown) that acquires the signal power and a noise power calculator (not shown) that acquires the noise power, both based on the output of mixer 103. For example, the signal power calculator may compute an absolute value of a real part of the output of mixer 103 as the signal power, and the noise power calculator may compute an absolute value of an imaginary part of the output of mixer 103 as the noise power.

As shown in FIG. 5, apparatus 500 may further include an estimator 105 that estimates a noise figure for an OFDM band or a sub-band of the OFDM band, or a different OFDM symbol than the one subject currently subjected through mixer 103. Estimator 105 may estimate the noise figure based on the signal power and the noise power of the subcarriers carrying pilot data generated by power calculator 104. Apparatus 500 may also include a smoother 106 that smoothes the signal power and/or the noise power of the subcarriers carrying the pilot data, and a power rectifier 107 that rectifies the signal power based on the noise power. Estimator 105 may further process the smoothed signal power and/or noise power and use the rectified signal power to compute the noise figure for the OFDM band, a sub-band, or a different OFDM symbol. In addition, apparatus 500 may include an output unit 108 that outputs the noise figure generated by estimator 105. Smoother 106 and rectifier 107 can be coupled to one or both power calculator 104 and estimator 105.

In some embodiments, estimator 105 in FIG. 5 may include a signal power calculator (not shown) that computes a sum or average of the signal power of the subcarriers carrying cell pilot data; and a noise power calculator (not shown) that computes a sum or average of the noise power of the subcarriers carrying cell pilot data.

In some exemplary embodiments, output unit 108 in FIG. 5 may include a first signal-to-noise ratio calculator (not shown) that calculates and/or smoothes a first signal-to-noise ratio; and a first signal-to-noise ratio output unit (not shown) that outputs the first signal-to-noise ratio or the smoothed first signal-to-noise ratio as the noise figure for the entire OFDM band, a sub-band, or another OFDM symbol than the one currently subjected through mixer 103. The first signal-to-noise ratio is, for example, a ratio of the sum of the signal power for the subcarriers carrying cell pilot data to the sum of the noise power for the subcarriers carrying cell pilot data; or a ratio of the average of the signal power to the average of the noise power for the subcarriers carrying cell pilot data. The first signal-to-noise ratio can be smoothed depending upon the index of the receiving antenna, the index of the transmitting antenna, and the index of the OFDM symbol containing cell pilot data with respect to other OFDM symbols.

In some other embodiments, output unit 108 may also include a second signal-to-noise ratio calculator (not shown) that calculates a second signal-to-noise ratio, and a second signal-to-noise ratio outputting unit (not shown in FIG. 5) that is adapted to output the second signal-to-noise ratio. The second signal-to-noise ratio is, for example, a ratio of the smoothed sum of the signal power to the smoothed sum of the noise power for the subcarriers carrying cell pilot data; or a ratio of the smoothed average of the signal power to the smoothed average of the noise power for the subcarriers carrying cell pilot data.

Correspondingly, in the above embodiments, in order to provide the smoothed sum or average of the signal power and/or noise power, estimator 105 may include a signal power calculator (not shown) that smoothes the sum or average of the signal power of the subcarriers carrying cell pilot data; and a noise power calculator (not shown) that smoothes the sum or average of the noise power of the subcarriers carrying cell pilot data. The output of the signal power calculator and the noise power calculator is provided to output unit 108.

As shown in FIG. 5 and noted above, apparatus 500 may include smoother 106 coupled to both power calculator 104 and estimator 105 to smooth the signal power and the noise power of the subcarriers.

In some other embodiments, output unit 108 may include a second smoother (not shown) that computes a sum or average of the noise power of the subcarriers carrying cell pilot data, and then smoothes the sum or average of the noise power based on the index of the receiving antenna, the index of the transmitting antenna, and the index of the OFDM symbol containing the cell pilot data with respect to other OFDM symbols. Output unit 108 may further include a noise output unit (not shown) that outputs the smoothed sum or average of the noise power.

Figure 6:
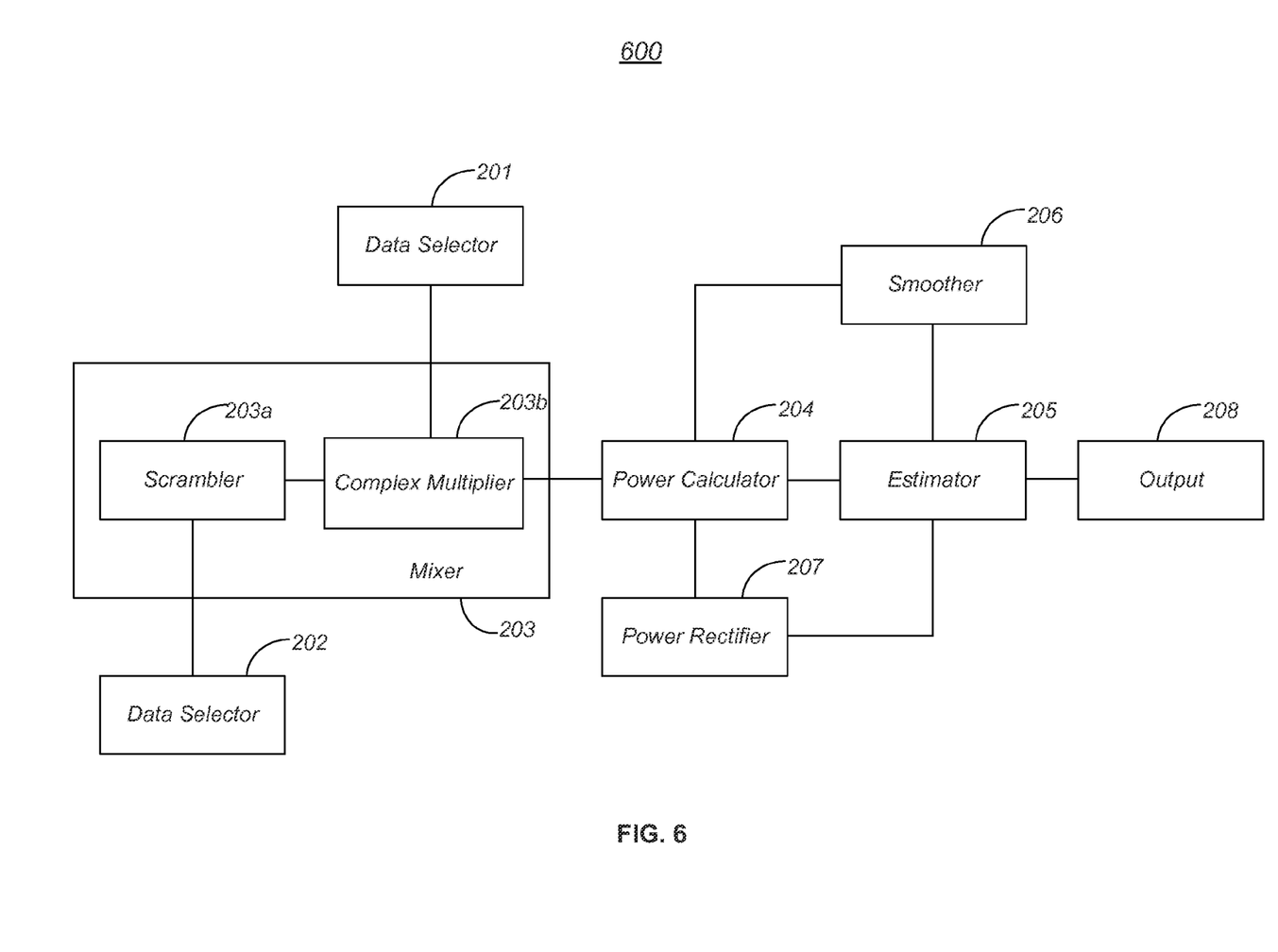
FIG. 6 illustrates an exemplary block diagram showing components for noise estimation in an apparatus consistent with another embodiment.

FIG. 6 is another exemplary block diagram of a communication terminal, apparatus 600, consistent with embodiments of the present disclosure. Apparatus 600 includes a first data selector 201, a second data selector 202, and a mixer 203 coupled to first data selector 201 and second data selector 202. First data selector 201 identifies or extracts cell pilot data from the frequency domain data in received OFDM symbols. Second data selector 202 identifies or extracts a channel estimation of subcarriers having cell pilot data from the frequency domain channel estimation of the OFDM symbols. Mixer 203 mixes cell pilot data and channel estimation of the subcarriers carrying cell pilot data. Mixer 203 differs from mixer 103 in FIG. 5 in that mixer 203 includes a scrambler 203a that scrambles the channel estimation of the subcarriers carrying cell pilot data, as opposed to descrambler 103a that descrambles cell pilot data. Mixer 203 also includes a complex multiplier 203b that performs a conjugate multiplication of the cell pilot data with the scrambled channel estimation of the subcarriers. Scrambler 203a is coupled to second data selector 202, and complex multiplier 203b is coupled to first data selector 201. One of ordinary skill in the art would appreciate that the illustrated diagram can be altered to delete blocks or further include additional blocks.

Likewise, although not shown in FIG. 6, apparatus 600 may further include one or more storage components such as a memory, latches, or registers that hold the cell pilot data and channel estimation identified and/or extracted by first data selector 201 and second data selector 202 for further processing by mixer 203. The storage components may be included within first data selector 201 and second data selector 202, or may be in a memory separate from but coupled to first data selector 201 and second data selector 202. The cell pilot data and channel estimation may be held in one storage component or separate storage components.

In some embodiments, mixer 203 may also include a scrambling code generator (not shown in FIG. 6) to generate a complex scrambling code sequence. Scrambler 203a scrambles the channel estimation of the subcarriers using the complex scrambling code sequence. Then, complex multiplier 203b carries out a conjugate operation on the scrambled channel estimation of the subcarriers, followed by a complex multiplication of the cell pilot data with the conjugation of the scrambled channel estimation of the subcarriers. Alternatively, complex multiplier 203b can carry out a conjugate operation on the cell pilot data, followed by a complex multiplication of the conjugation of the cell pilot data and the scrambled channel estimation of the subcarriers.

As shown in FIG. 6, apparatus 600 also includes a power calculator 204 coupled to mixer, an estimator 205 coupled to power calculator 204, a smoother 206, a power rectifier 207, and an output 208 coupled to the estimating unit 105. Smoother 206 and power rectifier 207 are both coupled to power calculator 204 and estimator 205. Power calculator 204, estimator 205, smoother 206, power rectifier 207, and output 208 can be the same as or similar to those shown in FIG. 5 and thus will not be described in detail here. In addition, the various embodiments as described above in connection with FIG. 5 can also be applied or adapted to the apparatus 600 or modifications thereto.

In some other embodiments, a computing unit of an apparatus may include both descrambler 103a in FIG. 5 and scrambler 203a in FIG. 6. Moreover, complex multiplier 103b in FIG. 5 and complex multiplier 203b in FIG. 6 can also be coupled, assembled, or integrated together. One of ordinary skill in the art would appreciate that any other combination of descrambler 103a, scrambler 203, complex multiplier 103b, and complex multiplier 203b can also be implemented—along with the first and second data selectors, power calculator, estimator, smoother, power rectifier, and output, as illustrated in FIGS. 5 and 6—in an apparatus consistent with embodiments of the present disclosure. One of ordinary skill in the art would appreciate that the various embodiments of the methods described corresponding to FIGS. 1-4 can be implemented on or realized by the apparatuses 500, 600, or any modification thereto.

One of ordinary skill in the art would also appreciate that features of the components illustrated in FIGS. 5 and 6 and described above can be implemented in either hardware or software. For example, data selectors may be implemented in hardware as multiplexers, demultiplexers, and determination logic circuits. Alternatively, data selectors may be implemented in software that, for example, receives data and isolates cell pilot data or channel estimate for subcarriers carrying cell pilot data. Likewise, one of ordinary skill would appreciate that a scrambler or descrambler, which comprises exclusive OR operations, can be implemented as easily in hardware as in software.

Communication terminals consistent with embodiments of the present disclosure, such as the apparatus illustrated in FIGS. 5 and 6, may be user equipment (UE) or mobile stations, or systems including such. Although not discussed herein, UE or mobile stations may include any one of or a combination of antennas, receivers, transmitters, processors, memories, and/or any other well-known communication components. Systems including UE or mobile stations may also include base stations, eNode Bs, relay stations, and/or access points.

In summary, embodiments consistent with the present disclosure provide estimation of noise power or signal-to-noise ratio for OFDM sub-bands or entire OFDM bands with a large dynamic range, as well as the precision or accuracy requirements imposed by the equalization or channel quality indicator (CQI) measurements.

Other embodiments of the subject matter will be apparent to those skilled in the art from consideration of the specification and practice of the subject matter disclosed herein. The scope of the disclosed subject matter is intended to cover any variations, uses, or adaptations of the subject matter following the general principles thereof and including such departures from the present disclosure as come within known or customary practice in the art. It is intended that the specification and examples be considered as exemplary only, with a true scope and spirit of the subject matter being indicated by the following claims.

It will be appreciated that the present disclosure is not limited to the exact construction that has been described above and illustrated in the accompanying drawings, and that various modifications and changes can be made without departing from the scope thereof. It is intended that the scope of the subject matter only be limited by the appended claims.

What is claimed is:

1. A method in a communication terminal for estimating noise in a multicarrier communication system, wherein communication in the multicarrier communication system is carried out over a plurality of subcarriers, comprising:
   receiving multicarrier symbols, the multicarrier symbols including pilot signals;
   estimating channel properties based on the received multicarrier symbols, wherein the channel properties include channel properties of a subcarrier carrying one of the pilot signals; and
   mixing the channel properties of the subcarrier carrying one of the pilot signals with a corresponding pilot signal to calculate a noise power for a corresponding subcarrier, wherein
      the mixing comprises a conjugate complex multiplication operation,
      the mixing comprises calculating the noise power by computing an absolute value of an imaginary part of a result from the conjugate complex multiplication; and
      the mixing comprises calculating a signal power of the corresponding subcarrier by computing an absolute value of a real part of the result from the conjugate complex multiplication.

2. The method of claim 1, wherein the mixing further includes calculating signal power or signal-to-noise ratio for the corresponding subcarrier.

3. The method of claim 2, further comprising:
   repeating the mixing for each subcarrier carrying a pilot signal within the multicarrier symbol or within a sub-band of subcarriers within the multicarrier symbol to calculate the noise power and signal power of each such subcarrier; and
   statistically combining the noise power and signal power of each such subcarrier to generate a noise figure for the plurality of subcarriers or for the sub-band of subcarriers.

4. The method of claim 3, wherein statistically combining comprises:
computing a sum or an average of the signal power of the subcarriers carrying pilot signals; and
computing a sum or an average of the noise power of the subcarriers carrying pilot signals.

5. The method of claim 3, wherein statistically combining comprises:
calculating a ratio of a sum of the signal power of the subcarriers carrying pilot signals to a sum of the noise power of the subcarriers carrying pilot signals, or a ratio of an average of the signal power of the subcarriers carrying pilot signals to an average of the noise power of the subcarriers carrying pilot signals.

6. The method of claim 5, wherein statistically combining further comprises smoothing the ratio of the sum or the ratio of the average to generate a smoothed ratio as the noise figure for the plurality of subcarriers or for the sub-band of subcarriers.

7. The method of claim 6, wherein the multicarrier communication system is a long term evolution (LTE) cellular communication system with multiple-input-multiple-output antenna configuration, and wherein smoothing the ratio to generate the noise figure is carried out based on one or more of the indices of transmitting antennas, the indices of receiving antennas, or the indices of the multicarrier symbols containing the pilot signals.

8. The method of claim 3, wherein statistically combining comprises:
calculating a smoothed sum of the signal power for the plurality of subcarriers or for the sub-band of subcarriers;
calculating a smoothed sum of the noise power for the plurality of subcarriers or for the sub-band of subcarriers; and
calculating a ratio of the smoothed sum of the signal power to the smoothed sum of the noise power as the noise figure for the plurality of subcarriers or for the sub-band of sub carriers.

9. The method of claim 8, wherein the smoothed sums are calculated based on one or more of the indices of transmitting antennas, the indices of receiving antennas, or the indices of the multicarrier symbols containing the pilot signals.

10. The method of claim 3, further comprising calculating a corrected signal power of each subcarrier to reflect the corresponding noise power, wherein statistically combining comprises statistically combining the noise power and the corrected signal power.

11. The method of claim 1, wherein the multicarrier communication system is based on orthogonal frequency division multiplexing (OFDM) technology and the multicarrier symbols are OFDM symbols.

12. The method of claim 1, wherein the communication terminal operates in at least one of LTE, WiMAX, and WiFi modes.

13. The method of claim 1, further comprising:
repeating the mixing for each subcarrier carrying a pilot signal within the multicarrier symbol or within a sub-band of subcarriers within the multicarrier symbol to calculate the noise power of each such subcarrier; and
statistically combining the noise power of each such subcarrier to generate a noise figure for the plurality of subcarriers or for the sub-band of subcarriers.

14. The method of claim 1, wherein the mixing comprises:
descrambling the one of the pilot signals; and
performing a conjugate complex multiplication of the channel estimation of the corresponding subcarrier and the descrambled pilot signal.

15. The method of claim 14, wherein the descrambling of the one of the pilot signals comprises:
generating a complex scrambling code sequence; and
descrambling the one of the pilot signals using the complex scrambling code sequence.

16. The method of claim 14, wherein performing the conjugate complex multiplication comprises:
performing a conjugate operation on the channel estimation of the corresponding subcarrier, and performing a complex multiplication of the descrambled pilot signal and the conjugate of the channel estimation of the corresponding subcarrier; or
performing a conjugate operation on the descrambled pilot signal, and performing a complex multiplication of the conjugate of the descrambled pilot signal and the channel estimation of the corresponding subcarrier.

17. The method of claim 1, wherein the mixing comprises:
scrambling the channel estimation of the corresponding subcarrier; and
performing a conjugate multiplication of the one of the pilot signals and the scrambled channel estimation of the corresponding subcarrier.

18. The method of claim 17, wherein the scrambling the channel estimation comprises:
generating a complex scrambling code sequence; and
scrambling the channel estimation of the corresponding subcarrier using the complex scrambling code sequence.

19. The method of claim 17, wherein performing the conjugate multiplication comprises:
performing a conjugate operation on the scrambled channel estimation of the corresponding subcarrier, and performing a complex multiplication of the one of the pilot signals and the conjugate of the scrambled channel estimation of the corresponding subcarrier; or
performing a conjugate operation on the one of the pilot signals, and performing a complex multiplication operation of the conjugate of the one of the pilot signals and the scrambled channel estimation of the corresponding subcarrier.

20. A communication terminal in a multicarrier communication system, wherein communication in the multicarrier communication system is carried out over a plurality of subcarriers, comprising:
a receiver receiving multicarrier symbols, the multicarrier symbols including pilot signals;
an estimator coupled to receive the multicarrier symbols and to estimate channel properties based thereon, wherein the channel properties include channel properties of a subcarrier carrying one of the pilot signals; and
a mixer coupled to mix the estimated channel properties of the subcarrier carrying one of the pilot signals with a corresponding pilot signal to calculate a noise power for a corresponding subcarrier, wherein
the mixer performs a conjugate complex multiplication on the channel properties of the subcarrier carrying one of the pilot signals and the corresponding one of the pilot signals,
the mixer calculates the noise power by computing an absolute value of an imaginary part of a result from the conjugate complex multiplication, and the mixer calculates a signal power of the corresponding subcarrier by computing an absolute value of a real part of a result from the conjugate complex multiplication.

21. The communication terminal of claim 20, wherein the multicarrier communication system is based on orthogonal frequency division multiplexing (OFDM) technology and the multicarrier symbols are OFDM symbols.

22. The communication terminal of claim 21, wherein the multicarrier communication system is a long term evolution (LTE) cellular communication system with multiple-input-multiple-output antenna configuration, wherein the one of the pilot signals corresponds to a transmitting antenna, the communication terminal further comprising:
- at least one receiving antenna;
- a selector that identifies an OFDM symbol including the one of the pilot signals corresponding to the transmitting antenna; and
- a storage that holds the one of the pilot signals from the OFDM symbol received at each of the at least one receiving antenna based on the subcarrier data of the subcarrier carrying the one of the pilot signals.

23. The communication terminal of claim 20, wherein the communication terminal operates in at least one of LTE, WiMAX, and WiFi modes.

24. The communication terminal of claim 20, wherein the mixer further calculates signal power or signal-to-noise ratio for the corresponding subcarrier.

25. The communication terminal of claim 24, wherein the mixer repeats the mixing for each subcarrier carrying a pilot signal within the multicarrier symbol or within a sub-band of subcarriers within the multicarrier symbol to calculate the noise power and signal power of each such subcarrier, and further statistically combines the noise power and signal power of each such subcarrier to generate a noise figure for the plurality of subcarriers or for the sub-band of subcarriers.

26. The communication terminal of claim 25, wherein the mixer statistically combines the noise power and signal power of each such subcarrier by computing a sum or an average of the signal power of the subcarriers carrying pilot signals and computing a sum or an average of the noise power of the subcarriers carrying pilot signals.

27. The communication terminal of claim 25, wherein the mixer statistically combines the noise power and signal power of each such subcarrier by calculating a ratio of the sum of the signal power of the subcarriers carrying pilot signals to the sum of the noise power of the subcarriers carrying pilot signals, or a ratio of the average of the signal power of the subcarriers carrying pilot signals to the average of the noise power of the subcarriers carrying pilot signals.

28. The communication terminal of claim 27, wherein the mixer statistically combines the noise power and signal power of each such subcarrier further by smoothing the ratio of the sum or the ratio of the average to generate a smoothed ratio as the noise figure for the plurality of subcarriers or for the sub-band of subcarriers.

29. The communication terminal of claim 28, wherein the multicarrier communication system is a long term evolution (LTE) cellular communication system with multiple-input-multiple-output antenna configuration, and wherein the mixer smoothes the ratio to generate the noise figure based on one or more of the indices of transmitting antennas, the indices of receiving antennas, or the indices of the multicarrier symbols containing the pilot signals.

30. The communication terminal of claim 25, wherein the mixer statistically combines the noise power and signal power of each such subcarrier by calculating a smoothed sum of the signal power for the plurality of subcarriers or for the sub-band of subcarriers, calculating a smoothed sum of the noise power for the plurality of subcarriers or for the sub-band of subcarriers; and calculates a ratio of the smoothed sum of the signal power to the smoothed sum of the noise power as the noise figure for the plurality of subcarriers or for the sub-band of subcarriers.

31. The communication terminal of claim 30, wherein the mixer calculates the smoothed sums based on one or more of the indices of transmitting antennas, the indices of receiving antennas, or the indices of the multicarrier symbols containing the pilot signals.

32. The communication terminal of claim 25, further comprising a calculator that calculates a corrected signal power of each subcarrier to reflect the corresponding noise power, wherein statistically combining comprises statistically combining the noise power and the corrected signal power.

33. The communication terminal of claim 20, further comprising a scrambler that scrambles the channel estimation of the corresponding subcarrier, wherein the mixer performs a conjugate multiplication of the one of the pilot signals and the scrambled channel estimation of the corresponding subcarrier.

34. The communication terminal of claim 33, wherein the scrambler generates a complex scrambling code sequence and scrambles the channel estimation of the corresponding subcarrier using the complex scrambling code sequence.

35. The communication terminal of claim 33, wherein the mixer performs a conjugate operation on the scrambled channel estimation of the corresponding subcarrier, and then performs a complex multiplication of the one of the pilot signals and the conjugate of the scrambled channel estimation of the corresponding subcarrier.

36. The communication terminal of claim 33, wherein the mixer performs a conjugate operation on the one of the pilot signals, and then performs a complex multiplication operation of the conjugate of the one of the pilot signals and the scrambled channel estimation of the corresponding subcarrier.

37. The communication terminal of claim 20, wherein the mixer repeats the mixing for each subcarrier carrying a pilot signal within the multicarrier symbol or within a sub-band of subcarriers within the multicarrier symbol to calculate the noise power of each such subcarrier, and further statistically combines the noise power of each such subcarrier to generate a noise figure for the plurality of subcarriers or for the sub-band of subcarriers.

38. The communication terminal of claim 20, further comprising a descrambler that descrambles the one of the pilot signals, wherein the mixer performs a conjugate complex multiplication of the channel estimation of the corresponding subcarrier and the descrambled pilot signal.

39. The communication terminal of claim 38, wherein the descrambler generates a complex scrambling code sequence and descrambles the one of the pilot signals using the complex scrambling code sequence.

40. The communication terminal of claim 38, wherein the mixer performs a conjugate operation on the channel estimation of the corresponding subcarrier, and then performs a complex multiplication of the descrambled pilot signal and the conjugate of the channel estimation of the corresponding subcarrier.

41. The communication terminal of claim 38, wherein the mixer performs a conjugate operation on the descrambled pilot signal, and then performs a complex multiplication of the conjugate of the descrambled pilot signal and the channel estimation of the corresponding subcarrier.

* * * * *